Patented Feb. 13, 1951

2,541,927

UNITED STATES PATENT OFFICE 2,541,927

HOT-MOLDABLE COMPOSITIONS AND MOLDED PRODUCTS

Edward L. Kropa, Old Greenwich, Conn., and John P. Dunne, Richmond Hill, N. Y., assignors to American Cyanamid Company, New York, N. Y., a corporation of Maine No Drawing. Application October 16, 1947, Serial No. 780,297

3 Claims. (Cl. 260—39)

This invention relates to new and useful hot-moldable (hot-formable) compositions and to products comprising the molded (shaped) compositions. More particularly the invention is concerned with such compositions containing a heat-curable melamine-formaldehyde resin and a thermoplastic modifier whereby molded products having improved properties, e. g., increased toughness combined with adequate impact and flexural strength characteristics and good electrical properties, are obtained. The invention is directed specifically to hot-moldable, substantially homogeneous compositions comprising (1) a heat-curable melamine-formaldehyde resin and (2) a thermoplastic product of polymerization of a polymerizable mass comprising at least about 25% by weight thereof of acrylonitrile, for instance, polyacrylonitrile (polymeric acrylonitrile), a copolymer of, by weight, from 25 to 99% of acrylonitrile and from 75 to 1% of a monovinyl-substituted aromatic hydrocarbon (e. g., styrene, dichlorostyrene, isopropenyl toluene, etc.), a copolymer of similar proportions of acrylonitrile and an alkyl ester of maleic or fumaric acids (e. g., dimethyl, -ethyl, -propyl, -isopropyl, etc., maleates and fumarates, etc.), and the like. To attain the advantages of the invention it is essential that the aforementioned resin and polymerization product be present in the composition in certain particular proportions, more particularly in the ratio of, by weight, from about 45 to about 95 parts of the former to from about 55 to about 5 parts of the latter. The lower proportions of polymerization product preferably are employed when such products comprise polyacrylonitrile or an acrylonitrile copolymer containing the higher percentages of combined acrylonitrile. The claims in the present application are directed specifically to compositions comprising a resinous melamine-formaldehyde condensation product and a plasticizer therefor consisting of 7.5 parts by weight of normally solid homopolymerized acrylonitrile to each 22.5 parts of the resinous product; and more particularly to a composition which is moldable under heat and which is a substantially homogeneous blend of the following ingredients in parts by weight:

Heat-curable melamine-formaldehyde resin__ 22.5
Solid, homopolymerized acrylonitrile_____ 7.5
Asbestos _____ 45.0 and to products comprising the molded compositions produced by molding the aforementioned heat-moldable compositions. In the molded compositions the melamine-formaldehyde resin is in a cured state.

Molding (moldable) compositions containing a heat-curable (heat-convertible) melamine-formaldehyde resin were known prior to our invention, the molded products being characterized by, for example, outstanding resistance to heat and arcing and by their low water-absorption values. Such compositions and products are described, for instance, in Widmer et al., U. S. Patent No. 2,310,004. It is suggested in this patent that various modifiers may be incorporated into the compositions, among which are mentioned compounds capable of reacting with aldehydes to form resins, specifically phenols, urea, thiourea, cyanamide, dicyandiamide, sulfonamides and aniline. Such compounds are co-reacted with the other reactants or intercondensed into a partial reaction product of the primary reactants to form mixed condensation products. It also is suggested in this patent that dyestuffs, filling materials, plasticizers and water-repelling agents may be added at any stage of the condensation reaction.

It also was suggested prior to our invention that monomeric acrylonitrile be employed as a modifier of reaction products of ingredients comprising a preformed polymethylol melamine and a halogenated acetamide; or of reaction products of ingredients comprising an aminotriazine, e. g., melamine, an aldehyde, e. g., formaldehyde, and certain halogenated nitriles, halogenated amides or halogenated acetones. However, to the best of our knowledge and belief it was not known or suggested prior to our invention that substantially homogeneous, hot-moldable compositions, which can be formed, as by molding, extruding, calendering, etc., to yield products comprising a cured, modified melamine-formaldehyde resin having improved properties, could be obtained by admixing or blending, e. g., under heat, (1) polyacrylonitrile or a thermoplastic copolymer containing at least about 25% by weight thereof of acrylonitrile combined therein and (2) a heat-curable melamine-formaldehyde resin as broadly described in the first paragraph of this specification and more fully hereafter.

The present invention is based on our discovery that thermoplastic products of polymerization of the kind described in the first paragraph of this specification can be incorporated into filled or unfilled compositions comprising a heat-curable (thermosetting) melamine-formaldehyde resin to yield substantially homogeneous molding (moldable) compositions which can be molded (shaped)

under heat to produce molded articles that are tougher and more elastic than the unmodified melamine-formaldehyde composition, while at the same time maintaining the good electrical and other useful properties characteristic of the melamine-formaldehyde resin. The acrylonitrile polymer or coplymer should be employed in a ratio, by weight, corresponding to not less than approximately 5 parts thereof for each 95 parts of the heat-curable melamine-formaldehyde resin in order to effect a material improvement in the toughness of the molded product. On the other hand, the acrylonitrile polymerization product should not be used in a ratio, by weight, exceeding approximately 55 parts thereof for each 45 parts of the heat-curable melamine-formaldehyde resin, since otherwise the composition is lacking in the desired molding and curing characteristics, and the physical and electrical properties of the molded product are materially impaired as compared with a product similarly made from an unmodified melamine-formaldehyde molding composition.

Good results are obtained with hot-moldable compositions which are substantially homogeneous blends of ingredients comprising (1) a heat-curable melamine-formaldehyde resin and (2) a thermoplastic product of polymerization of a polymerizable mass containing not less than about 50% by weight thereof of acrylonitrile, the ingredients of (1) and (2) being present in such compositions in the ratio of, by weight, from 50 to 85 parts of the former to from 50 to 15 parts of the latter. The thermoplastic polymerization product in our new compositions imparts toughness to the molded composition containing the melamine-formaldehyde resin which has been heat-blended with the polymerization product and ultimately cured in its presence during molding. During heat-blending of the melamine-formaldehyde resin and the polymerization product, or during molding of the resulting moldable composition, or during both such steps, it is possible that co-reaction between the aforementioned ingredients may take place.

It was quite surprising and unexpected that polymers and copolymers of acrylonitrile of the kind described in the first paragraph of this specification could be compounded, as by dry blending followed by hot milling, with a heat-curable melamine-formaldehyde resin in the presence or absence of fillers and other conventional components of molding compositions, especially since such polymerization products, e. g., polyacrylonitrile of high molecular weight, are generally considered to be intractable materials that can be softened only at very high temperatures and pressures. Furthermore, such polymerization products, specifically those containing at least about 65% by weight thereof of acrylonitrile, are soluble in only a relatively few solvents. Hence it would not be expected and could not be predicted that substantially homogeneous compositions could be obtained by hot blending a polymerization product of the kind with which our invention is concerned and a heat-curable melamine-formaldehyde resin. It is believed that these results are obtained because of the affinity between the nitrile (—CN) groups in the acrylonitrile polymer or copolymer and the triazine nucleus, which contains

groups, of the melamine-formaldehyde resin. It is known that the —CN groups in an acrylonitrile polymer undergo polymerization reactions at elevated temperatures, and hence during hot blending of the polymeric or copolymeric acrylonitrile with the melamine-formaldehyde resin the former, which may be represented by R—CN where R represents the polymer residue, may undergo further polymerization through the nitrile groups to yield a polymer represented by

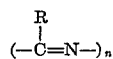

which is more compatible or more easily dispersed in the heat-curable melamine resin than the starting polymerization product.

In carrying our invention into effect a polymer or copolymer (thermoplastic copolymer) of acrylonitrile is prepared in accordance with methods now well known to those skilled in the art. In the preparation of copolymers a mixture of monomers comprising, by weight, at least about 25% and preferably not less than 40 or 50% of acrylonitrile is employed. For instance, the monomeric mixture may contain from 60% to 99.5% by weight of acrylonitrile.

Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl-substituted (monovinyl-substituted) aromatic compounds, for instance styrene and the various nuclearly substituted styrenes (e. g., the various mono- and dimethyl styrenes, the chloro, fluoro and other halogeno styrenes, the cyano styrenes, etc.), a, p-dimethyl styrene (isopropenyl toluene) and other α-substituted, nuclearly substituted styrenes, vinyl naphthalenes, vinyl pyridines, vinyl fluorenes, vinyl dibenzofurans, etc.; allyl, methallyl and other unsaturated monohydric alcohol esters of monobasic acids, e. g., allyl and methallyl acetates, lauranates, cyanides, etc.; methacrylonitrile, ethacrylonitrile and other hydrocarbon-substituted acrylonitriles; and numerous other vinyl, acrylic and other compounds containing a single $CH_2=C<$ grouping which are copolymerizable with acrylonitrile to yield thermoplastic copolymers. Reference is made to the copending application of Henry P. Wohnsiedler and Edward L. Kropa Serial No. 780,296, filed concurrently herewith, for additional examples. Alkyl esters of alpha, beta-unsaturated polycarboxylic acids also may be copolymerized with acrylonitrile to yield copolymers which are suitable for use in practicing the present invention. Examples of such esters are the dimethyl, -ethyl, -propyl, -isopropyl, -butyl, etc., esters of maleic, fumaric, citraconic, mesaconic, etc., acids.

Any suitable method of polymerizing the monomeric acrylonitrile or mixture of monomers may be employed. One suitable method is in an aqueous emulsion using a suitable polymerization catalyst, e. g., ammonium persulfate. Other polymerization methods, however, also may be employed, e. g., methods such as those described in Bauer et al. U. S. Patent No. 2,160,054. The polymerization may be effected in the presence of a plasticizer for the polymerization product as disclosed and claimed in the copending application of Walter M. Thomas, Serial No. 780,309, also filed concurrently herewith. The polymeric or copolymeric acrylonitrile may be of any suitable molecular weight, but ordinarily will be within the range of 15,000 to 300,000 or higher, as calculated from viscosity measurements using the Staudinger equation (reference: U. S. Patent No. 2,404,713).

The heat-curable melamine-formaldehyde resins used in practicing our invention are prepared by known methods, for instance as described in Talbot U. S. Patent No. 2,260,239 and Widmer et al. U. S. Patent No. 2,310,004. In preparing such products the ratio of formaldehyde to melamine may be varied as desired or as conditions may require, but ordinarily will be within the range of from about 1½ to about 9 mols of the former per mol of the latter. The reaction may be effected under acidic, neutral or alkaline conditions, but usually the initial reaction is carried out under neutral or alkaline conditions. The use of modifying reactants, e. g., urea, thiourea, dicyandiamide, etc., is not precluded, but if such reactants are employed it is preferred that they constitute a minor mol proportion of the mixed or total formaldehyde-reactable materials; that is, the melamine reactant should constitute a major mol proportion (more than 50 mol per cent) and the modifying reactant a minor mol proportion (less than 50 mol per cent) of the combined substances which are reactable with the formaldehyde. The formaldehyde reactant is generally used in the form of an aqueous solution. Paraformaldehyde, trioxane or other compounds engendering formaldehyde may be employed instead of aqueous formaldehyde.

The polymerization product and the heat-curable melamine-formaldehyde resin, with or without fillers or other ingredients commonly used in the preparation of molding compositions, are compounded or blended together, for instance by mixing in suitable mixing equipment, e. g., a Banbury mixer, a ribbon-type blender, a ball mill, etc., followed by milling or sheeting on differential rolls (one of which is generally hotter than the other), thereby to obtain a substantially homogeneous composition. During the compounding operation, e. g., while sheeting on heated differential rolls, the mixture is heated to a temperature which is at least sufficiently high to soften the polymerization product, e. g., at an average temperature of about 100° to about 150° C. Such heating facilitates the dispersion of the polymeric or copolymeric acrylonitrile and simultaneously therewith slightly advances the cure of the heat-curable melamine-formaldehyde resin. In no case are the temperature and time of compounding sufficient to convert the heat-curable melamine-formaldehyde resin to a substantially infusible state. However, as has been indicated, the temperature should be sufficiently high to soften the polymerization product and to disperse it in the melamine resin. As milling proceeds the clearance between the rolls may be adjusted, if desired, thereby to provide a further control of the temperature of the mix during milling.

Illustrative examples of fillers that may be incorporated into the molding composition at any suitable stage of its manufacture are alpha-cellulose, wood flour, walnut shell flour, asbestos in the form of a powder or short or long fibers, finely divided silicon carbide, carbon black, diatomaceous earth, slate dust, powdered rutile, powdered or flake mica, powdered quartz, powdered glass, cloth cuttings (e. g., cuttings of silk, rayons, wool, linen, cotton, nylon, or of cloth made from glass fibers or from polymeric or copolymeric acrylonitrile fibers, etc.), ground cork, sand, etc. If desired, the filler and melamine-formaldehyde resin may first be compounded or blended together, after which the polymerization product is incorporated therewith under heat. The proportions of filler may be varied as desired or as conditions may require. Thus, depending, for instance, upon the particular filler employed and the intended use of the molded article, the filler may constitute, for example, from 5 to 80% by weight of the molding composition.

Dyes, pigments, plasticizers (e. g., succinonitrile, glutaronitrile, phthalonitrile, $\beta,\beta'$-dicyanoethyl ether, etc.), curing agents (e. g., phthalic anhydride, ammonium chloride, ammonium silicofluoride, ammonium borofluoride, etc.), mold lubricants (e. g., zinc stearate, etc.) also may be introduced into the molding composition, e. g., by mixing with either of the primary components before they are admixed with each other or conjointly with the polymerization product and heat-curable melamine-formaldehyde resin when they are compounded or blended together.

In order that those skilled in the art better may understand how the present invention may be carried into effect, the following examples are given by way of illustration and not by way of limitation. All parts and percentages are by weight.

*Example 1*

In this example a copolymer of acrylonitrile and isopropenyl toluene was employed. Such copolymers may be prepared, for instance, in the manner disclosed and claimed in Kropa U. S. Patent No. 2,310,961. Specifically, the copolymer used in this example was prepared by heating 14.6 parts of isopropenyl toluene and 7.9 parts of acrylonitrile in an aqueous dispersion containing about 1.25% thereof of polyvinyl alcohol as an emulsifying or dispersion agent. The dispersion also contained about 0.23 part of a 30% aqueous solution of $H_2O_2$ as a polymerization catalyst. Heating was continued for 48 hours at a gradually increasing temperature which reached about 95° C. as a maximum. On standing, the copolymer separated as a very finely divided mass. The impure copolymer was separated from the water by centrifuging, and any polyvinyl alcohol contaminant removed therefrom by washing with water in a centrifuge. The copolymer was dried to obtain a fine, granular material. From a nitrogen analysis it was calculated that it contained about 27.4% of combined acrylonitrile. In order to obtain a product of uniform particle size, the copolymer was passed through a serrated grinder. The resulting material was used in making a molding composition as described below:

| | Parts |
|---|---|
| Heat-curable melamine-formaldehyde resin | 15.0 |
| Acrylonitrile-isopropenyl toluene copolymer | 5.0 |
| Calcined asbestos | 30.0 |
| Zinc stearate | 0.5 |

The above ingredients were mixed together and then milled for 1½ minutes on hot rolls maintained at 110° C. The resulting sheets were broken up and pulverized in a rotary mill to obtain a substantially homogeneous molding powder. Portions of this powder were molded into discs and bars by heating for 5 to 6 minutes at about 155° C. under a pressure of approximately 3750 pounds per square inch. The molded articles were hard, tough, substantially homogeneous and had a good surface appearance. The following test data were obtained on the molded specimens:

| | |
|---|---|
| Izod impact strength_____ft. lbs./in__ | 0.328 |
| Flexural strength_____lbs./sq. in__ | 11,450 |
| Mils flexing (mils flexed before breaking) | 25 |
| Dielectric strength at 23.3° C__volts/mil__ | 400 |
| Dielectric strength at 100° C_____do____ | 327 |
| Arc resistance_____seconds__ | 160 |
| Shrinkage_____mils per inch____ | 2.7 |

Example 2

A copolymer of acrylonitrile and isopropenyl toluene was prepared by heating under reflux for 40 hours a mixture containing the following ingredients:

| | Parts |
|---|---|
| Acrylonitrile _____ | 315.0 |
| Isopropenyl toluene_____ | 285.0 |
| Water _____ | 1520.0 |
| Polyvinyl alcohol (10% aqueous solution) | 52.5 |
| Hydrogen peroxide (30% aqueous solution) | 6.3 |

At the end of the reaction period the dispersion of copolymer was blown with steam in order to remove any volatile material that might have been present. None was apparent. The white, finely divided copolymer was separated, water washed and dried. Calculations made from a nitrogen analysis showed that it contained about 43.2% of combined acrylonitrile. This copolymer was used in the molding composition described below:

| | Parts |
|---|---|
| Heat-curable melamine-formaldehyde resin | 22.5 |
| Acrylonitrile-isopropenyl toluene copolymer | 7.5 |
| Calcined asbestos_____ | 45.0 |

The same procedure was followed as described under Example 1 with the exception that the time of milling on hot rolls maintained at 110° C. was 1¾ minutes. The molded pieces were hard, tough, substantially homogeneous and had a good surface appearance. The following test data were obtained on the molded articles:

| | |
|---|---|
| Izod impact strength_____ft. lbs./in__ | 0.333 |
| Mils flexing _____ | 22 |
| Dielectric strength at 25.5° C__volts/mil__ | 389 |
| Dielectric strength at 100° C_____do____ | 328 |
| Arc resistance_____seconds__ | 160 |
| Shrinkage _____mils per inch__ | 2 |

Example 3

Same as Example 2 with the exception that polyacrylonitrile was used in place of the acrylonitrile-isopropenyl toluene copolymer, the milling time was 1¼ minutes and the temperature of the rolls was 120° C. since the polymer would not soften at a roll temperature of 110° C. Hard, tough, molded articles were obtained. The following test data were obtained on the molded pieces:

| | |
|---|---|
| Izod impact strength_____ft. lbs./in__ | 0.308 |
| Flexural strength_____lbs./sq. in__ | 9,980 |
| Mils flexing_____ | 21 |
| Dielectric strength at 22.2° C___volts/mil__ | 412 |
| Dielectric strength at 100° C_____do____ | 398 |
| Arc resistance_____seconds__ | 150 |

Example 4

Five parts of polyacrylonitrile in the form of an impalpable powder, 95 parts of heat-curable melamine-formaldehyde resin and 1 part of zinc stearate (mold lubricant) were dry-blended together for about 30 minutes, and the blend was then heated on differential rolls (60 mils clearance between the rolls) for 15½ minutes. The slower roll was maintained at a temperature of about 90° C. and the faster roll at about 130° C. The resulting sheet material was broken and crushed into granules. Samples of the resulting unfilled molding composition were molded for 10 minutes at about 155° C. under a pressure of about 3750 pounds per square inch. When a molded piece was immersed in boiling water for 30 minutes it absorbed only 0.28% by weight of water. The molded articles showed improved flexibility, that is, a lower modulus of elasticity, as compared with articles similarly made from melamine-formaldehyde molding compositions containing no polyacrylonitrile.

Example 5

Same as Example 4 with the exception that 15 parts of a slightly coarser polyacrylonitrile and 85 parts of the melamine-formaldehyde resin were used, and the dry blend was heated for 8½ minutes on differential rolls, the slower one of which was maintained at about 105° C. while the faster one was maintained at about 140° C. The clearance between the rolls was 60 mils. A molded specimen absorbed only 0.16% by weight of water when tested for water-absorption as described under Example 4. The flexibility of the molded pieces was slightly better than that of the products of Example 4.

Example 6

One hundred and twenty-two (122) parts of succinonitrile was melted and poured over 228 parts of polyacrylonitrile. The rough blend was transferred to differential rolls having a clearance of 40 mils. The blend was milled on the rolls, both of which were maintained at 150° C., for approximately 5 minutes. The charge was slow to soften but gradually became continuous and leathery with a smooth surface grain. The sheet was removed from the rolls, and then broken and crushed to pass through a 1/16-inch screen. The screened, plasticized polyacrylonitrile was dried in the oven at 85° C. for about 30 minutes, and was then used in making a molding composition as described below:

| | Parts |
|---|---|
| Heat-curable melamine-formaldehyde resin__ | 769 |
| Succinonitrile-plasticized polyacrylonitrile__ | 231 |
| Zinc stearate_____ | 10 |

The aforementioned ingredients were dry-blended together for about 30 minutes, and the blend then was transferred to differential rolls, the slow roll being heated at about 110° C. and the fast roll at about 140° C. Milling on the rolls (60 mils clearance between the rolls) was continued for 10½ minutes, after which the material was removed as a single sheet about ¼-inch thick. The sheet was broken, crushed into granules and molded as described under Example 4. The modulus of elasticity was only 0.89 as compared with 1.16 and 1.13 for that of molded articles of Examples 4 and 5, respectively.

Heat-curable melamine-formaldehyde resins also may be used as a binder for polymers and copolymers of acrylonitrile such as those herein-before mentioned when the latter are in the form of filaments, fibers, threads, yarns, sheets, fabric (woven or matted), or other form. For instance, a laminated article was produced by bonding together superimposed layers of a fabric made from threads of polyacrylonitrile, the fabric having been impregnated with a heat-curable melamine-formaldehyde resin. The impregnating solution comprised 120 parts of the melamine resin, 20 parts of 2B alcohol and 60 parts of water. Strips, 4½ inches by 18½ inches in size, of the polyacrylonitrile fabric material were immersed in the above solution, dried in air at room temperature and were then heated for 8 minutes at 115° C. Twenty parts of 50% aqueous alcohol was added to the impregnating solution, and the strips were re-dipped and re-dried as above described. The resulting strips were cut into pieces 4¼ by 4¼ inches in size. A laminated article, which contained about equal parts by weight of melamine-formaldehyde resin and polyacrylonitrile fabric, was formed by heating the crossed, superimposed layers of impregnated fabric for 50 minutes at 130° C. under a pressure of 1000 pounds per square inch. The laminate had a thickness of 0.052 inch and an excellent general appearance. It had a dielectric strength at 25° C., between $\frac{3}{16}$-inch electrodes, or 570 volts per mil. The values for dielectric constant and dissipation factor, measured at different cycles and at room temperature, are shown below:

| Cycles | Dielectric Constant | Dissipation Factor |
|---|---|---|
| 60 | 5.69 | 0.0484 |
| $10^2$ | 5.69 | 0.0398 |
| $10^3$ | 5.34 | 0.0281 |
| $10^4$ | 5.10 | 0.0217 |
| $8.7 \times 10^4$ | 5.10 | 0.0214 |
| $10^6$ | 4.94 | 0.0190 |

Other properties are shown below in comparison with those of other laminates similarly made frome alpha-paper and canvas:

| | Polyacrylonitrile Laminate | Alpha-paper Laminate | Canvas Laminate |
|---|---|---|---|
| Dynstat flexural strength, kgs. per sq. cm | 1,800 | 1,500 | 1,460 |
| Dynstat bending angle, degrees | 49 | 7 | 8 |
| Dynstat impact strength, kgs. per sq. cm | 228 | 13 | 15 |
| Per cent of water absorbed after immersion in 25° C. water for 24 hours | 0.39 | 0.84 | 0.80 |

The hot-moldable (hot-formable) compositions of this invention may be shaped or formed, as by molding, extruding, calendering, etc., at temperatures ranging, for example, from 130° to 180° C. and at pressures varying from 1000 to 20,000 pounds or more per square inch. They may be molded by compression-, injection- or transfer-molding technique. The molding (moldable) compositions show good flow characteristics during molding, and the molded articles are substantially homogeneous throughout and have a good surface appearance. Furthermore, they are tougher and show increased flexibility (lower modulus of elasticity) as compared with molded articles made from melamine-formaldehyde molding compositions containing no polymeric or copolymeric acrylonitrile modifier such as is used in practicing our invention. Also, they usually show less shrinkage when molded about inserts than moldings obtained from unmodified melamine-formaldehyde molding compositions.

Because of the improved flow characteristics of our hot-moldable compositions, they are especially adapted for use in the molding of intricate parts. Thus they may be employed in molding lighting fixtures, parts of electrical appliances (including electrically insulating parts), bathroom and other household fixtures and ornamental objects, etc. They also may be used in forming surface sheets upon plywood and other laminated articles, and as an overlay for other plastic and other structural materials.

The terms "molding" and "moldable" as used herein (including the claims) are employed in a broad sense and are intended to include within their meanings any means of forming or shaping the compositions to which the expressions apply, including molding (in the more limited meaning of the word), calendering, extruding or any other means of forming the composition to a desired shape. Likewise, the term "molded" as used herein has a correspondingly broad meaning.

In our divisional application Serial No. 168,382, filed June 15, 1950, claims are made to a hot-moldable, substantially homogeneous composition comprising (1) a heat-curable melamine-formaldehyde resin and (2) a thermoplastic copolymer of copolymerizable ingredients including acrylonitrile and a monovinyl-substituted aromatic hydrocarbon, the acrylonitrile constituting at least about 25% by weight of the total copolymerizable ingredients used in forming the copolymer of (2), and the ingredients of (1) and (2) being present in the said composition in the ratio of, by weight, from about 45 to about 95 parts of the former to from about 55 to about 5 parts of the latter; as well as to products comprising such molded compositions and in which the melamine-formaldehyde resin is in a cured state.

We claim:

1. Composition comprising a resinous melamine-formaldehyde condensation product and a plasticizer therefor consisting of 7.5 parts by weight of normally solid homopolymerized acrylonitrile to each 22.5 parts of the resinous product.

2. A composition which is moldable under heat and which is a substantially homogeneous blend of the following ingredients in parts by weight:

Heat-curable melamine-formaldehyde resin __ 22.5
Solid, homopolymerized acrylonitrile _____ 7.5
Asbestos _____ 45.0

3. A product comprising the molded composition of claim 2 and in which the melamine-formaldehyde resin is in a cured state.

EDWARD L. KROPA.
JOHN P. DUNNE.

REFERENCES CITED

The following references are of record in the file of this patent:

UNITED STATES PATENTS

| Number | Name | Date |
|---|---|---|
| 2,191,581 | Nowak et al. | Feb. 27, 1940 |
| 2,388,293 | Schroy et al. | Nov. 6, 1945 |
| 2,463,032 | Hanson | Mar. 1, 1949 |

OTHER REFERENCES

Pages 80, 81, 89 to 93, "Synthetic Resins and Rubbers," by Powers. Published 1943 by John Wiley and Sons, N. Y.

Certificate of Correction

Patent No. 2,541,927 February 13, 1951

EDWARD L. KROPA ET AL.

It is hereby certified that error appears in the printed specification of the above numbered patent requiring correction as follows:

Column 4, line 45, for "lauranates" read *laurates*; column 9, line 28, for the word "or" read *of*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*